Jan. 16, 1934.  L. C. FREEMAN  1,943,665
FRONT END CONSTRUCTION FOR MOTOR VEHICLES
Filed Nov. 24, 1930
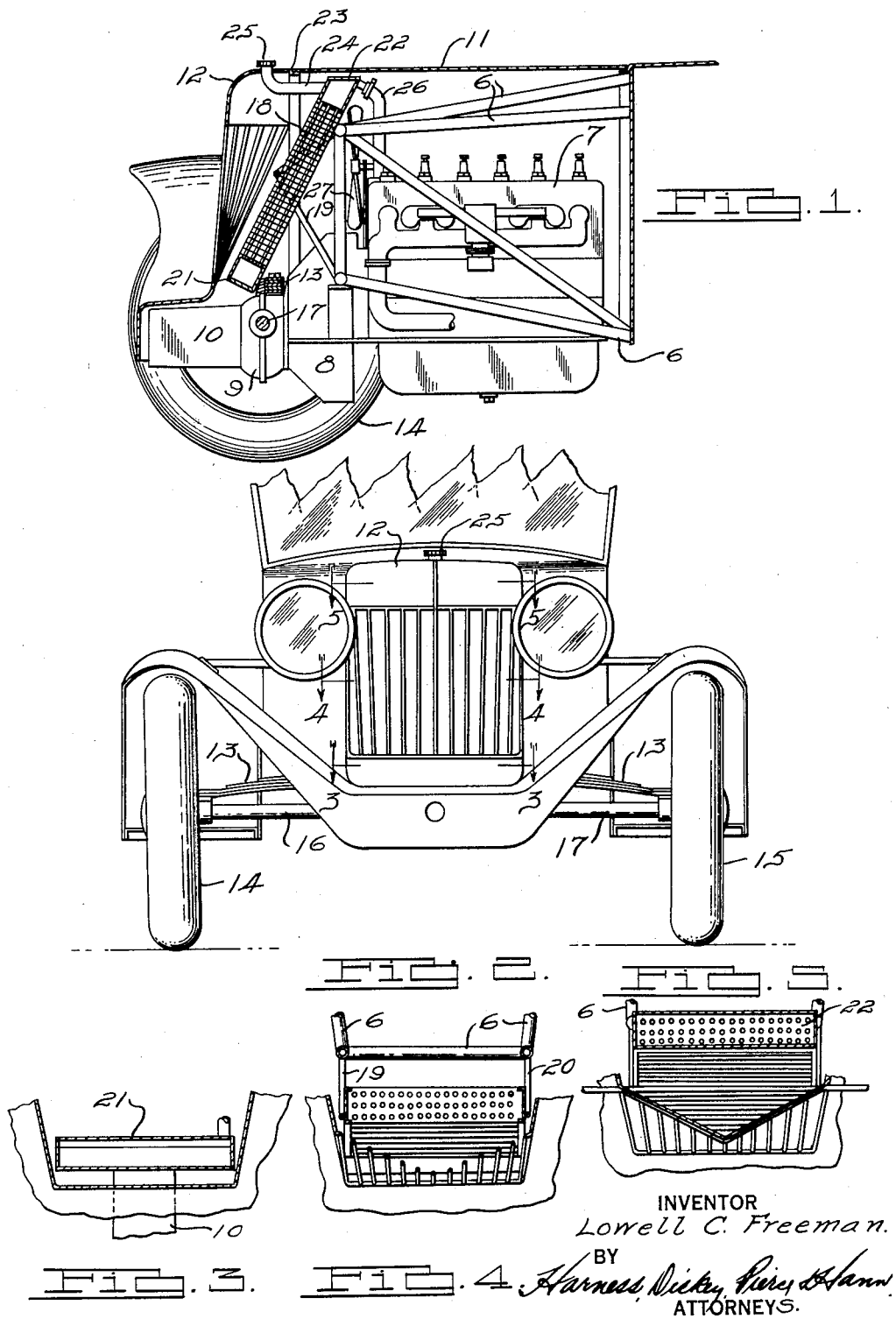
INVENTOR
Lowell C. Freeman.
BY
Harness, Dickey, Pierce & Mann
ATTORNEYS.

Patented Jan. 16, 1934

1,943,665

UNITED STATES PATENT OFFICE 1,943,665

FRONT END CONSTRUCTION FOR MOTOR VEHICLES

Lowell C. Freeman, Detroit, Mich., assignor to Resengin, Inc., a corporation of Michigan Application November 24, 1930
Serial No. 497,697

2 Claims. (Cl. 180—54)

This invention relates to motor vehicle constructions of the front wheel drive type.

The main objects of this invention are to provide an improved front end construction of motor vehicle in which a radiator of relatively large frontal surface area is disposed back of a false front of relatively less projected area; to provide an improved construction in which the hood and front end will be of normal height at the same time housing a radiator of considerably larger size than the front end of the hood; and to provide an improved construction particularly adaptable for front wheel drive vehicles.

An illustrative embodiment of this invention is shown in the accompanying drawing, in which:

Fig. 1 is a fragmentary view partly in elevation and partly in vertical longitudinal section of the front end of a motor vehicle embodying my improved invention.

Fig. 2 is a view in front elevation of the same.

Fig. 3 is a sectional view taken on the line 3—3 of Fig. 2, looking in the direction indicated.

Fig. 4 is a sectional view taken on the line 4—4 of Fig. 2 looking in the direction indicated.

Fig. 5 is a sectional view taken on the line 5—5 of Fig. 2, looking in the direction indicated.

At the present time in the construction of motor vehicles, the trend of design is toward a relatively tall narrow type of radiator so that the vehicle presents a rather pointed front. In order that the top of the hood may be kept at a reasonably low point so as not to obstruct the driver's view, it is necessary for the radiators to extend down a considerable distance between the side rails of the chassis in order to provide sufficient radiating surface for the requirements of the motor.

In the construction of front wheel drive automobiles, the clutch, transmission and differential mechanisms are disposed at the front end of the internal combustion motor, thus making a relatively long power unit. If a radiator of sufficient frontal area to cool the motor is provided as in the customary rear wheel constructions, then such radiator must be placed in advance of these driving mechanisms and this further increases the length of the hood and front end of the car by several inches.

This undue length of front end is objectionable. Therefore, at the present time it is customary in front wheel constructions to position the radiator rearwardly of the driving mechanism and necessarily above it. Such disposal has necessitated the radiator being of rather short height from top to bottom, and consequently, the usual amount of frontal surface has not been provided for the proper cooling of the motor.

To offset this lack of surface therein, some constructions have employed a relatively high speed fan for drawing the air through the radiator in an attempt to make a radiator of small frontal area perform the functions of cooling a motor which is too large for it. Such high speed fans are noisy and even when quiet will not produce sufficient air flow to properly cool a motor using a materially undersized radiator.

Radiators of considerable depth from front to rear have also been employed but are inefficient in that the air entering at the front surface of the radiator will be raised in temperature so that before it reaches the rear side it will be substantially that of the water which it is to cool.

In my improved construction the general and accepted height of hood, width of front and the like have been preserved by building a false front for the hood of the vehicle and then placing a radiator of full sized frontal area and normal thickness in a slanting position behind this false front and beneath the hood.

In the construction shown in the drawing, a motor vehicle having a front framework 6 is provided with a power unit comprising an internal combustion motor 7, clutch 8, differential 9, and transmission 10 disposed in the order named on the front end of the motor. A forwardly extending hood 11 covers the power unit and a false front 12, having openings therein for the passage of air therethrough, encloses the front end of the hood 11. The false front 12 is substantially vertical at its medial point as shown in Fig. 1 and the top thereof, at each side from the center, is raked rearwardly as shown most clearly in Figs. 1, 4 and 5, thus providing a warped surface at each side of the vertical middle point thereof.

Transversely extending springs 13 are secured to the power unit, preferably to the housing which surrounds the differential, and the outer ends thereof are attached to road wheels 14 and 15 which are driven by axle shafts 16 and 17, respectively.

A radiator core 18, having a plane front surface of greater frontal surface area than the area of the openings through the false front, and also having a greater surface area than the area of the false front 12 projected on the front elevation of the car, is mounted on forwardly extending brackets 19 and 20 with the lower end 21 thereof located in front of the springs 13 and above the power unit driving mechanisms as shown most clearly in Fig. 1. The radiator 18 is inclined rearwardly so that the top end 22 thereof is spaced rearwardly from the front end 23 of the hood 11. A filler pipe 24 may be provided which extends forwardly from the front side of the top tank of the radiator and turns upwardly so that the cap 25 is positioned in the false front 12 so as to present the appearance of the customary and accepted construction.

A connection 26 is provided which provides communication between the water jacket of the engine and the top tank of the radiator in the usual manner. Another suitable connection (not shown) is provided for communicating between the bottom tank of the radiator and the water pump of the motor in the usual manner. A fan 27 is disposed at the rear side of the radiator 18 in the customary manner for drawing air through the radiator.

In the use of this construction a radiator of full size frontal area and normal thickness, designed to cool the particular internal combustion motor used, is placed in a slanting position beneath the hood and the angle at which it is placed is so determined that a radiator of full size frontal area will be entirely housed beneath the false front 12 and the hood 11 with the bottom of the radiator spaced rearwardly from the front end of the power unit mechanisms.

In this arrangement the length of the front end of the vehicle is no longer than is required for the power unit mechanisms and at the same time the height and width of the hood is not increased or varied from that which is considered as an acceptable design at the present time. By placing the radiator in this slanting position a normally proportioned radiator which is amply adequate for the requirements of the engine may be utilized and no forced draft mechanisms such as high speed fans are required for cooling purposes.

Although but one specific embodiment of this invention has been herein shown and described, it will be understood that numerous details of the construction shown may be altered or omitted without departing from the spirit of this invention as defined by the following claims.

I claim:

1. In a motor vehicle, the combination with a forwardly extending hood and a false front thereon provided with openings for the passage of air therethrough, of a radiator disposed beneath said hood and front, said radiator being inclined relative to said false front and having a frontal surface area exceeding the area of the openings in said false front.

2. In a front wheel drive construction of a motor vehicle, the combination of a power unit comprising a motor and clutch, differential and transmission mechanism on the front end of said motor, a forwardly extending hood over said power unit, a radiator having its lower end disposed above said power unit mechanisms, and a false front on said hood provided with openings therein for the passage of air therethrough and through said radiator to said motor, said radiator being inclined rearwardly relative to said false front and having a frontal surface area exceeding the area of the openings in said false front.

LOWELL C. FREEMAN.